United States Patent

[11] 3,543,950

| [72] | Inventor | John L. Peterson |
| | | Spokane, Washington |
| [21] | Appl. No. | 863,734 |
| [22] | Filed | Aug. 11, 1969 |
| | | Continuation-in-part of Ser. No. 666,614, Sept. 11, 1967, abandoned. |
| [45] | Patented | Dec. 1, 1970 |
| [73] | Assignee | Atlas Spokane, Inc. |
| | | a corporation of Washington |

[54] PARTICLE HANDLING APPARATUS
8 Claims, 13 Drawing Figs.
[52] U.S. Cl. ..................................... 214/10, 214/17
[51] Int. Cl. ..................................... B65g 65/28
[50] Field of Search ........................... 214/10, 17.8, 17.82

[56] References Cited
UNITED STATES PATENTS
3,011,658 12/1961 Peterson ................. 214/10
3,407,943 10/1968 Douglass ................. 214/17

Primary Examiner—Robert G. Sheridan
Attorney—Wells and St. John

ABSTRACT: An apparatus for transfer of particles from a storage pile to a conveyor system designed for particulated materials, such as sawdust, which readily "bridge" or otherwise obstruct normal flow to a conveyor system. It includes a support surface for the pile, including recessed transfer conveyors open to the supporting surface, along with an encircling powered ring which carries a series of rigid arms that extend inwardly toward the center of the ring. These rigid arms are pivotally connected to the ring so as to be free to move inwardly and outwardly to engage the peripheral contour of the pile at the support.

In one preferred embodiment described, a biasing force is provided on the individual arms in an equalized manner to normally move them inward toward the center of the ring. This is provided by means of a frictional drag ring that engages the support and a force transmitting mechanism including independently movable shuttle carriages on the ring connected to the individual arms by means of rigid bars.

Patented Dec. 1, 1970

INVENTOR.
JOHN L. PETERSON
BY
ATTYS.

INVENTOR.
JOHN L. PETERSON
ATTYS.

3,543,950

PARTICLE HANDLING APPARATUS

RELATED PATENT APPLICATION

This is a continuation-in-part of U.S. Pat. application Ser. No. 666,614, filed Sept. 11, 1967, now abandoned.

BACKGROUND OF THE INVENTION

Particulated materials, such as sawdust, are difficult to convey in a continuously operated automatic system, because such materials have a tendency to form arches or to "bridge" the entrance to the conveyor system. When such arches are formed, they must be broken by manual effort in most instances, a task that is both difficult and dangerous. Naturally, such manual effort largely dissipates the advantages of an automated system, since it requires constant manual surveillance.

Prior efforts to overcome this difficulty have largely been directed toward the use of rigid mechanical digging devices which are either rotatable and extend radially outward from the center of the apparatus, as shown in U.S. Pat. No. 2,755,942 to Broberg and U.S. Pat. No. 2,736,461 to Dueringer, or which extend diametrically across the pile as shown by U.S. Pat. No. 2,792,153 to Douglass and U.S. Pat. No. 2,496,146 to Broughman. All of these prior devices are inflexible, in that the digging elements extend through the storage area at all times, regardless of the quantity of the material contained therein. The resistance to movement of such elements is proportionally greater as the size of the pile increases and the weight thereof also increases, and the necessity of building such devices to withstand maximum force when the structure is fully loaded makes their practical utilization most difficult and impractical.

One solution to this problem is disclosed in my prior U.S. Pat. No. 3,011,658, titled "Apparatus for Particle Transfer for a Storage Pile". This structure includes an encircling ring that is powered to turn about the center of the support for the particle storage pile, the ring being used to trail digging members which conform to the outside of the pile at the surface. As the pile of particles grows in width, these members will move outwardly so that they always work against the outside of the pile in a normal operation and normally are not subjected to substantial variations in force load.

While the structure shown in my prior patent has proven to be highly successful, it also has limitations. It is primarily useful in large storage areas. The flexible members specifically disclosed therein require that some central support be fixed on the unit to prevent the inner ends of the members from becoming entangled with one another. This central member in turn requires that the radial span across the support floor be greater than the maximum distance that can be arched by the material so that the members will at all times engage at least one leg of any arch that forms. One purpose of the present disclosure is to provide an arrangement wherein the diametric dimension of the storage unit can be equal to this minimum radial dimension in my prior disclosure by providing a device that eliminates the need for the central member.

Another problem with the structure shown in my prior patent is the difficulty of pulling the pile engaging members from a pile of material placed over them while the ring is stationary and while the members extend inwardly across the pile supporting surface. While the members can normally work outward from any onrush of material being stored while the ring is turning, the force required to pull them from a pile placed on them while they are stationary is considerable and has led at times to mechanical failure. Therefore, another object of this disclosure is to provide an arrangement capable of pulling the particle moving devices from a pile placed on them while stationary.

A disclosure of rigid sweep arms is indicated in U.S. Pat. No. 3,407,943 to Douglass. However, no provision is made for pulling the arms from a pile dropped upon them suddenly. Without protection from this danger, the arms must push against solid material during rotation of the apparatus and failure is imminent.

SUMMARY OF THE DISCLOSURE

Like my earlier disclosure, the present apparatus also uses a powered annular member such as a peripheral ring mounted on a supporting surface interrupted by recessed conveyors. In place of flexible drag members of or sweeps, rigid inwardly directed arms trail behind pivot axes on the ring. Each arm is arched or curved in the direction of movement of the ring so that the inwardly directed surfaces thereof are concave in a horizontal plane. Each arm has a protective member or cover mounted immediately above and fixed to the arm. The protective member extends transversely from both sides of the arm and diminishes in horizontal thickness toward the trailing end of the arm. After collapse of a pile above an arm, the recess formed beneath this member permits the arm to be pulled outward from the pile along a curved path without encountering horizontal forces due to pile engagement intermediate the arm ends.

The arms may be urged inwardly of the ring by any suitable means. The surface frictional forces applied to the curved arms resting on a horizontal slab or surface will lead the trailing arm ends toward the pile center to work against the other outer periphery of the pile.

In one embodiment described herein, additional biasing force is provided on each arm in an equalized manner so as to urge the inner end of the arms toward the center of the moving ring. This is provided without additional power devices through means of a frictional drag arrangement that engages the support surface together with force transmitting means connected to the individual arms and interconnected about the ring to the several arms which act in concert. Other arrangements using hydraulic cylinders for biasing of the arms are also included herein.

DISCLOSURE OF THE PREFERRED EMBODIMENT

Figure 1:
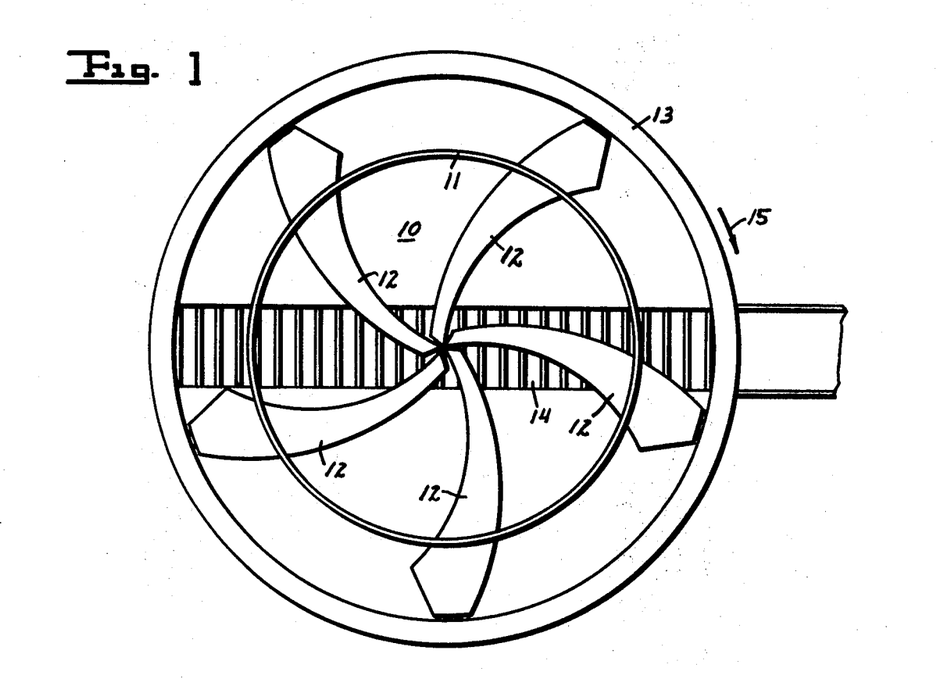
FIG. 1 is a schematic top view of the basic structure of the present apparatus.
Figure 2:
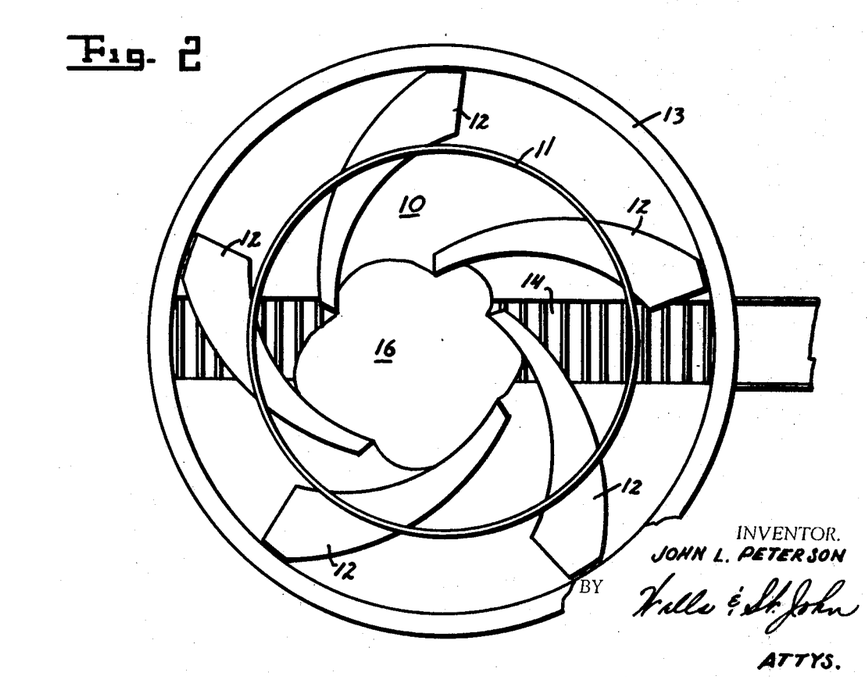
FIG. 2 is a view similar to FIG. 1 illustrating the use of the apparatus to carry particles from a storage pile to a recessed conveyor.

The general features of the apparatus can best be understood from a study of FIGS. 1 and 2 and the disclosure of my prior U.S. Pat. No. 3,011,658. As seen in FIGS. 1 and 2, the essential features of the structure, which are common to the disclosure of my prior patent, include a support bed 10 for the storage pile of particles, such as sawdust. The support bed 10 may be formed of any suitable material, such as metal, wood or concrete, or may be the supporting ground surface itself. It should be formed with an upper horizontal surface on which the pile of material rests, and this surface should be relatively even in surface configuration for bearing purposes and frictional engagement by the particle handling arms.

The bulk particles, such as sawdust, are normally dumped in a stack configuration at the center of the support bed 10, and the outside of the pile will normally have a conical shape unless confined by upright walls. As shown, a confining circular wall for the pile of materials is provided at 11 at a fixed elevation above the support bed 10, the wall 11 terminating immediately above a series of rigid arms 12 that are pivotally connected at their outer ends to a ring mechanism 13 that is powered for movement about a vertical center axis. The trailing portions of arms 12 curved inwardly toward the center of ring 13 and diminish in thickness in a horizontal configuration. The total effective length of each arm from its axis on the ring mechanism 13 along a straight line is equal to the radial separation between the axis on the ring and the axis of said ring on bed 10. A recessed conveyor apparatus 14 is embedded in the support bed 10 and extends outwardly therefrom for reception of particles and transfer of the particles to other systems, such as a furnace or th other particle receiving mechanism.

The wall 11 forms the outer boundary of the pile immediately above the arms 12, and the minimum diameter across the inner surfaces of wall 11 should be slightly greater than the maximum distance that can be bridged by the particles in the pile. In this way, at least one leg of any bridge formed by the particles will extend to the support bed 10 so that it can be intersected by the inwardly directed path of the moving arms 12. The direction of movement of the ring apparatus 13 is indicated in FIGS. 1 and 2 by the arrow 15.

The arms 12 are shown in detail in FIGS. 3, 4, 6 and 10. Each arm basically comprises a pair of horizontal members 35 spaced vertically from one another and pivotally connected to the respective horizontal walls 18 and 20 of the ring apparatus 13, the pivotal connections being shown at 36. The members 35 extend inwardly from the ring apparatus 13 beyond the wall 11, and support horizontally enlarged upper plates 37 on each arm 12 which diminish in horizontal thickness toward the trailing inner end of each arm 12. The plates 37 serve as a protection cover for the arms and are supported by the bed 10 by means of upright elongated curved plates 38 which form the actual digging members that tear at the base of the particle pile 16. The side edges of plate 37 extend outward to each side of plate 38. They converge toward the trailing end of each arm 12.

The purpose of the converging width of each cover or plate 37 is to form a vertically open recess or pocket of inwardly diminishing width at both sides of the elongated curved plate 38 following pile collapse upon the arm while located inward of the wall 11. The arm 12 can then be pulled through this arcuate pocket, in a curved path. The arm 12 is left free to pivot outward about its pivotal connection to ring 13. The progressively enlarged curved configuration of the recess formed toward the outside of the pile eliminates lateral obstruction of arm movement during removal of the arm.

The arms 12 must be capable of moving completely outward of wall 11 to clear a complete pile structure and work against its edge immediately under wall 11. To insure this, the arms 12 should be as wide as possible, but the maximum inward width of plates 37 must be no greater than the radial separation between the circular line of pull of the arms 12 at their respective pivots and the inner surface of wall 11. It is also desirable to use a flattened horizontal curvature for the arms 12, but the concave radius of curvature of the inner edge of each plate 37 can be no greater than the radius of the inner surface of wall 11 when this maximum width is used, in order that no portion of plates 37 protrude inward of wall 11 while the arms engage the pile under wall 11. The radius of curvature of the inwardly facing edge of each plate 37 is therefore less than the maximum pile radius.

As shown in FIG. 2, the arms 12, due to their curvature and frictional engagement across the support bed 10 and the grate that covers the conveyor apparatus 14, tend to move inwardly toward the center of the ring apparatus 13 in response to rotation about the center of bed 10. This inward movement is limited by the engagement of each arm with the outer periphery of the storage pile shown at 16. The pile 16 might be somewhat offcenter, as illustrated in FIG. 2, but this is compensated for by the ability of each arm 12 to move independently of the other arms 12 and to freely follow the outer contour of periphery of pile 16. The continuous dragging of particles from the lower periphery of the pile 16 serves to bring the particles across the conveyor apparatus 14 in a controlled manner, making automated transfer of materials from a stationary pile possible. The structure shown is particularly useful in small diameter storage facilities, since the rigid arms cannot be entangled even though the apparatus might be empty as seen in FIG. 1. In addition, should material be added to pile 16 while the ring apparatus 13 is stationary and with the arms 12 extending inwardly of the wall 11, the arms 12 can pull outwardly from the pile in an arc dictated by their curvature. The diminishing horizontal thickness of the cover afforded by the plate 37 on each arm 12 toward its free trailing inner end provides an open recess for escape of arm 12 and progressively decreases the resistance to such movement. The arms 12 can be retracted without encountering transverse resistance against plates 38 and resultant damage to the mechanism that moves the ring 13.

Under some circumstances, it is advisable to provide a positive biasing force on the independently movable arms 12 to urge them toward the center of the ring apparatus 13 and to insure that each arm 12 properly engages the lower periphery of the particle pile 16. One such apparatus, using frictional forces provided by the turning movement of ring 13 is illustrated in detail in FIGS. 3 through 11. However, other devices can be used for this purpose, and might involve the use of spring or other biasing devices to accomplish similar results.

The annular ring apparatus 13 comprises a large channel-shaped circular ring including an upright wall 17, an upper horizontal wall 18 and a lower horizontal wall 20. The wall 20 is spaced vertically above the upper surface of the support bed 10 and is parallel to it. The wall 17 is vertical. Fixed to the outer periphery of wall 17 is an outwardly facing continuous channel 21 having a continuous strip of resilient material 22 adhered to it. The strip 22 is frictionally engaged by a continuous driving chain 23 wrapped about the ring apparatus 13 and powered by a motor structure as shown at 24 (FIG. 3). 3). The ring apparatus is turned about its vertical center axis by movement of the chain 23, which imparts rotational movement to the ring due to frictional engagement with strip 22. This movement is preferably continuous during operation of the device.

The ring apparatus 13 is supported about its periphery by rolling engagement of horizontal wheels 25 against the inner surface of a boundary ring 26 fixed to the support bed 10. The ring apparatus 13 is elevationally positioned relative to the support bed 10 by vertical wheels 27 (FIG. 8) which ride on a circular upright channel 28 which in turn is supported frictionally on the support bed 10. The channel 28 is carried by wear plates 30 located equiangularly about the apparatus and being in frictional engagement with the upper surface of support bed 10.

Also fixed to the wear plates 30 is an outer circular channel 31 that is located relative to boundary ring 26 by means of horizontal rollers 32 rotatably mounted about stationary vertical axes relative to support bed 1. Thus, the ring apparatus 13 is free to rotate independent of the channels 28, 31, although the latter are also free to rotate about the common vertical axis of the ring apparatus 13. The weight of the ring apparatus 13 bears upon the wear plates 30 due to the support provided through the wheels 27. Additional weight is provided by a continuous hollow ring 33 supported above the wall 18 and filled with concrete or other material to insure the proper frictional forces at the wear plates 30.

Figure 3:
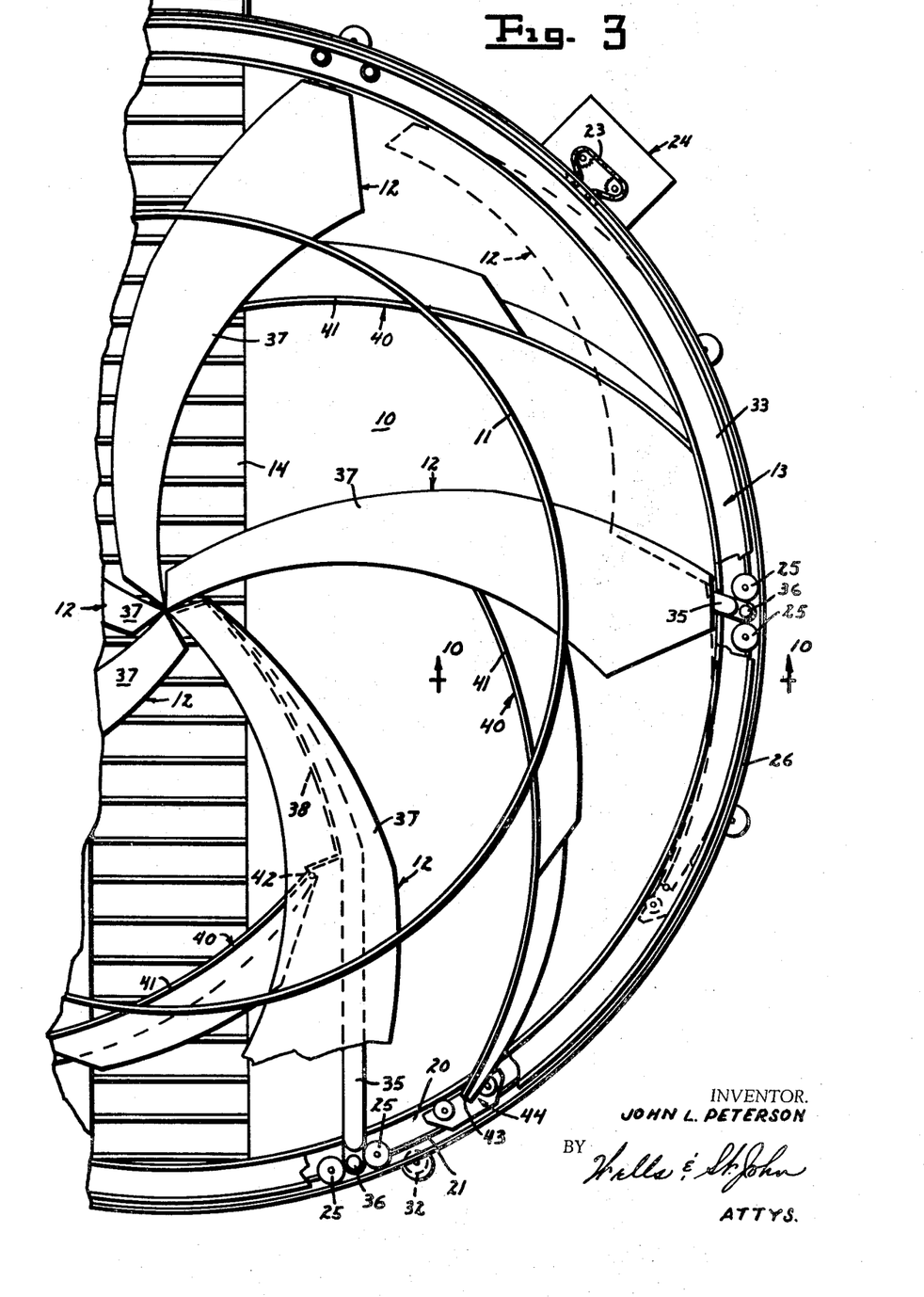
FIG. 3 is an enlarged partial top view of a preferred form of the apparatus with portions of the structure being broken away and shown in dashed lines.
Figures 4, 11:
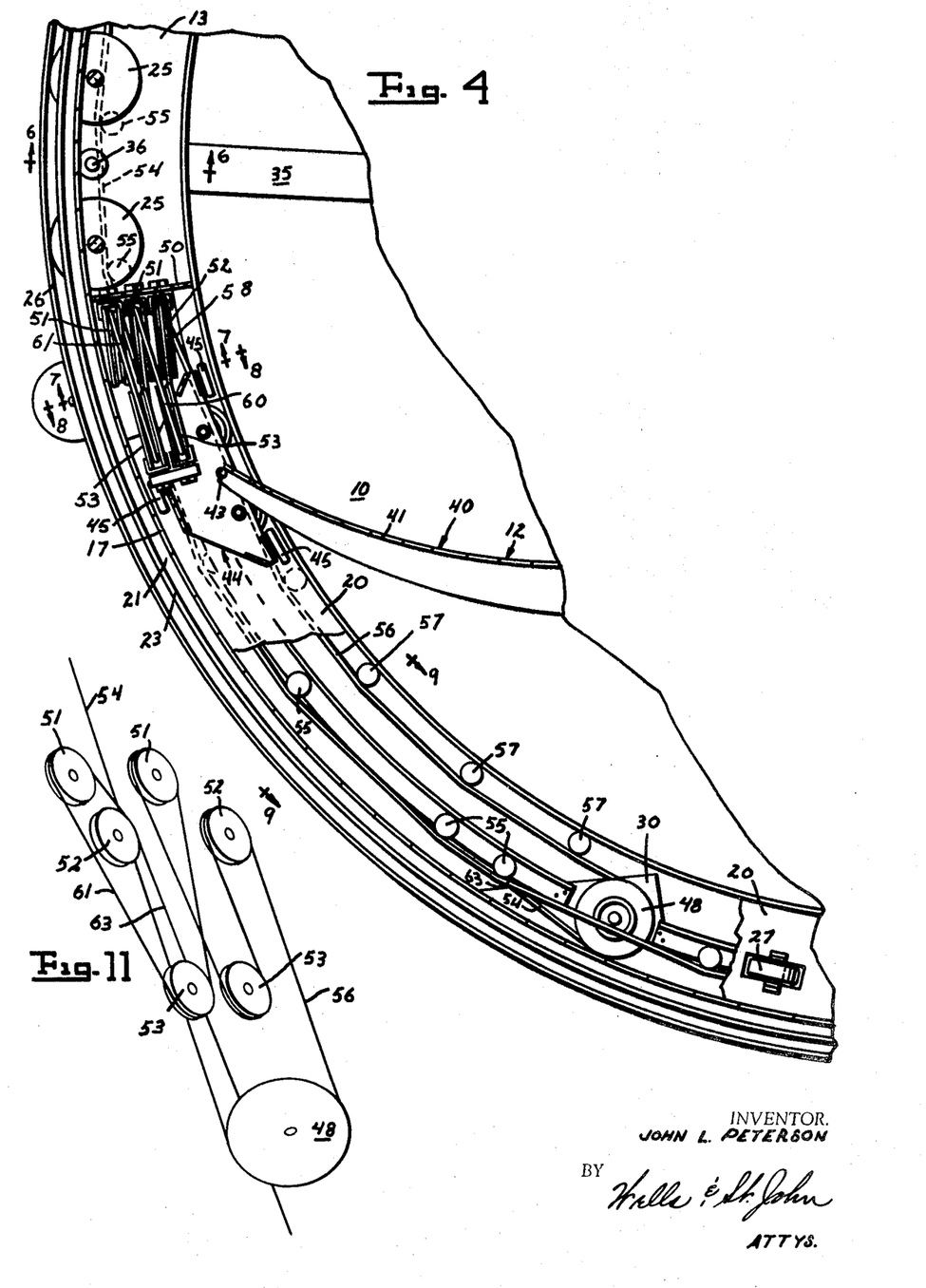
FIG. 4 is a further enlargement of the apparatus that controls the movement of a single arm as shown in FIG. 3, with portions of the structure being broken away or shown in dashed lines.
FIG. 11 is a schematic view showing the essentials of the force transfer apparatus for a single arm.
Figure 10:
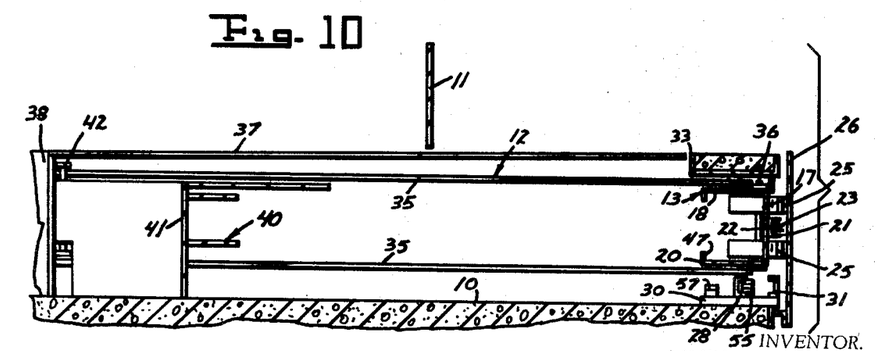
FIG. 10 is a fragmentary sectional view at an enlarged scale taken along line 10–10 in FIG. 3.

Extending forwardly from each arm 12 in the direction of rotation of the ring apparatus 13 is a bar 40 basically comprising an upright plate 41 that serves as a forward continuation of plate 38. The bar 40 is pivotally connected to the respective arm 12 about an axis shown at 42 (FIGS. 3, 10). It is pivotally connected at its outer end about a parallel vertical axis at 43 on a shuttle carriage designated by the numeral 44.

Figure 5:
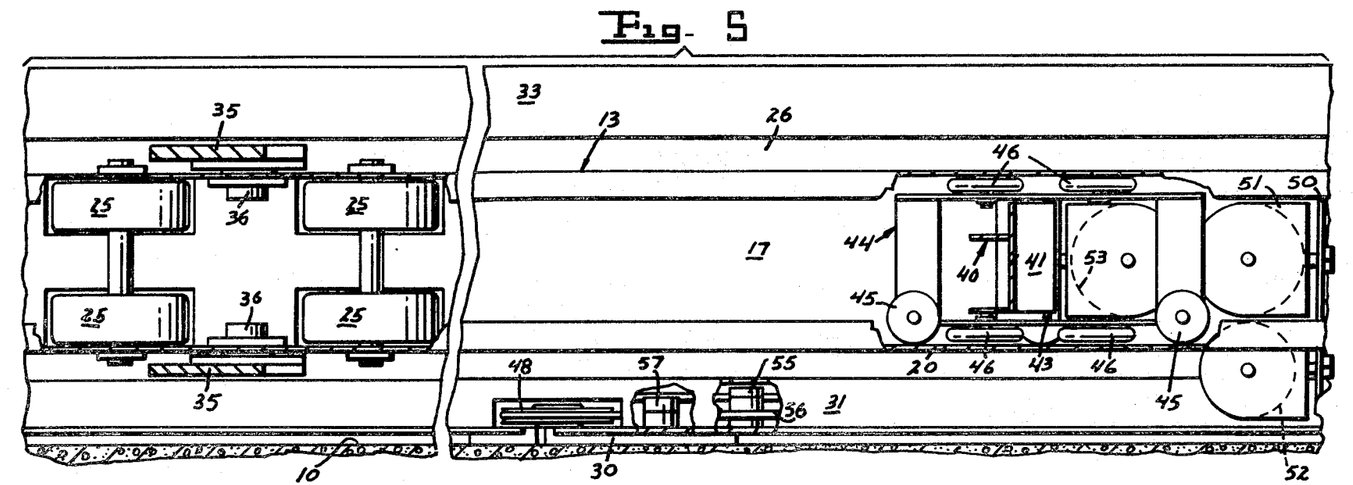
FIG. 5 is an elevation view from the outside of the structure with the powering ring wall being eliminated, showing the basic structure associated with a single arm at a scale greater than in FIG. 4.
Figure 6:
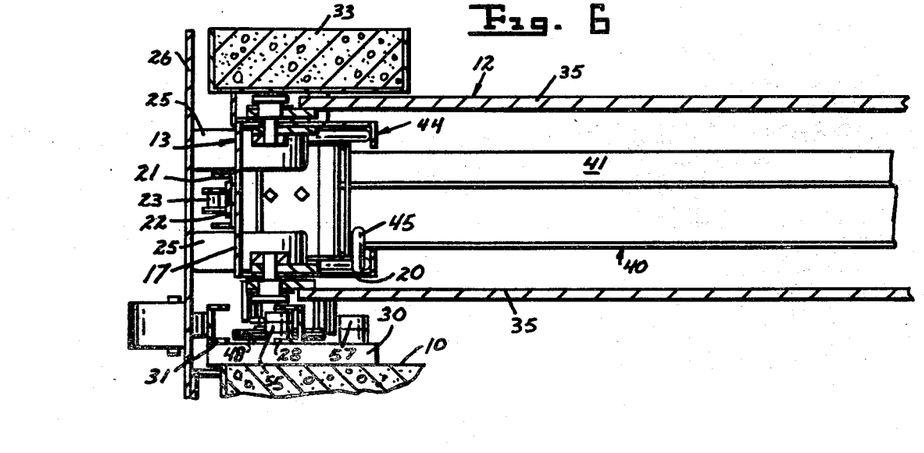
FIG. 6 is an enlarged fragmentary sectional view taken along line 6–6 in FIG. 4.
Figure 7:
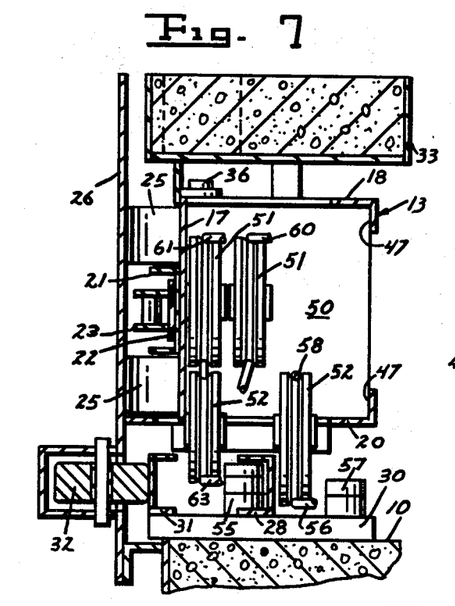
FIG. 7 is an enlarged cross-sectional view taken along line 7–7 in FIG. 4.
Figure 8:
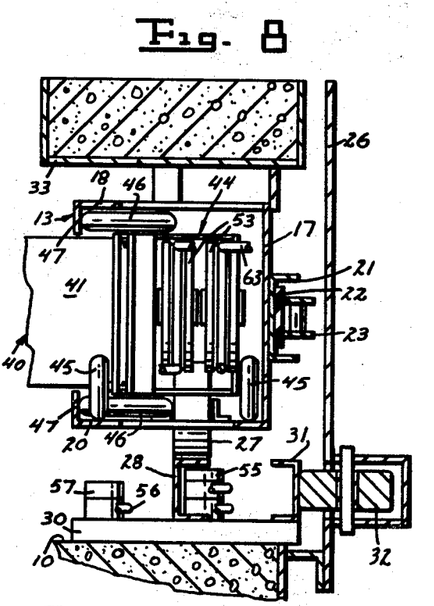
FIG. 8 is an enlarged cross-sectional view taken along line 8–8 in FIG. 4.
Figure 9:
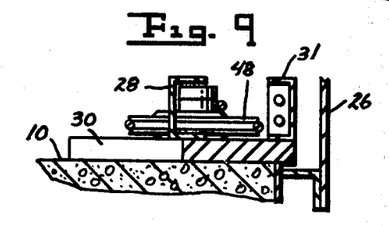
FIG. 9 is an enlarged cross-sectional view of a drag pulley apparatus taken along line 9–9 in FIG. 4.

The structure of each shuttle carriage 44 can best be seen in FIGS. 5, 6 and 8. The carriage 44 comprises a short skeleton framework mounted within the confines of the ring apparatus 13. It is vertically supported by lower wheels 45 that ride along a continuous portion of the lower wall 20 of the ring apparatus 13. The carriage 44 is urged inwardly relative to ring apparatus 13 by the bar 40, and is movably supported by horizontal wheels 46 which engage the faces of inner ledges 47 that extend continuously about the inner edges of the walls 18 and 20 respectively. The individual shuttle carriages 44 are therefore free to travel in an arcuate path about the center of ring apparatus 13 within the confines of the moving ring structure.

Each wear plate 30 is located forward of the pivotal connection 36 of one arm (FIG. 4) and rotatably supports a horizontal sheave 48. The sheave 48 is positioned intermediate the pivotal connection 36 for an arm 12 and the shuttle carriage 44 operatively connected to it by bar 40. Located forward of each carriage 44 is a radial plate 50 fixed across the ring apparatus 13, which supports a series of sheaves including a pair of upper upright sheaves 51 and a pair of lower upright sheaves 52. The adjacent shuttle carriage 44 supports also a pair of upright sheaves 53 which are in elevational alinement with the sheaves 51. The sheaves 51, 52 and 53 are supported for pivotal movement about horizontal axes so as to facilitate proper cable alinement between them. While the drawings illustrate the pulleys in vertical positions, the tension exerted on the cable connecting these sheaves will actually tilt them about their respective horizontal axes so as to properly aline the supporting sheave portions for minimum cable wear.

All of the arms 12 about the ring apparatus 13 are interconnected by means of a single continuous cable. The cable connections are shown in detail in FIG. 4 and are illustrated schematically on the same sheet of drawings at FIG. 11. The incoming lead of the cable for a single arm is designated at 54. It is guided about the ring apparatus 13 by bearing posts 55. It extends rearwardly (opposite to the direction of movement of the ring apparatus) to the sheave 48, and is wrapped about the rear of sheave 48. It then extends forwardly at 56, again being guided by an inner set of posts 57 on the ring apparatus 13. The cable extends under and over the forward portion of the inner sheave 52 on the ring apparatus 13 and rearwardly at 58. It is wrapped about the rear of the inner sheave 53 on the shuttle carriage 44 and then extends forwardly again at 60. It is wrapped downwardly about the forward portion of the outer sheave 51 on the ring apparatus 13 and back again over the outer sheave 53 on the shuttle carriage 44. It then extends forwardly again at 61 and is returned across the forward portion of the outer sheave 52 on the ring apparatus 13. The final reach of the cable from sheave 52 is shown at 63, which then extends in a rearward direction about the ring apparatus 13 to the identical arrangement operatively connected to the succeeding arm 12.

With the structure as shown, the power applied to the ring apparatus 13 will tend to move the ring apparatus ahead of the channels 28 and 31 that support it, whose movement is retarded by the frictional drag provided by the wear plates 30. The tendency of the wear plates 30 to lag behind the ring apparatus 13 results in the shuttle carriage 44 being drawn toward the sheaves 51 and 52 by reason of the cable connections just described. This tends to move the bars 40 in a forward direction relative to the arms 12, tending to urge the arms 12 toward the center or vertical axis of the ring apparatus 13. However, when working against the periphery of a particle pile, this inward movement will eventually be resisted by contact with the particles.

The force which will be exerted against the pile is limited by the frictional drag provided by the wear shoes 30, which in turn can be increased or decreased by varying the weight in the upper ring 33. Each arm 12 is still free to move independently of the others, so as to follow the contour of the pile periphery. The forces exerted against the pile by the various arms will be equalized among them due to the common force transmission system provided by the single cable that connects them. This structure provides a continuous biasing force tending to move the arms 12 inwardly for proper contact with the particle pile, and does not require the utilization of outside power as might be required in a hydraulic system or other type of biasing mechanism.

Furthermore, the apparatus is self-compensating, and the force at any single arm will be only that force necessary to insure the required pressure against the pile. No arm will tend to dig into the pile a distance greater than the others, since the force exerted at each arm will be equal regardless of its particular angular location relative to the ring apparatus 13.

If the apparatus is at rest and the structure is then filled with material, the arms 12 will be confronted with considerable resistance to rotational movement along with the ring apparatus 13. However, due to the curved relationship of the protective plates 37 and the diminishing horizontal thickness of the recess formed thereby toward thereby toward the center of the apparatus, the arms 12 can be pulled outwardly in a curve so that each arm will be pulled along its length through the recess it has created in the pile. This eliminates the possibility of damage to the turning mechanism at the ring apparatus 13, and permits the arms 12 to then work against the edge of the pile which will be formed below the inside upright wall 11.

Figure 12:
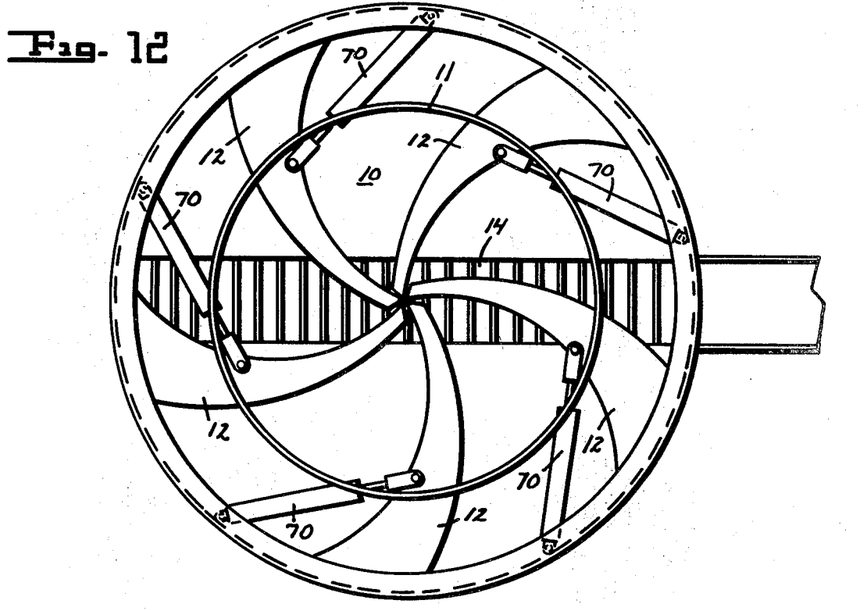
FIG. 12 is a view similar to FIG. 1, showing a modification of the basic structure.

One modification of the structure is shown in FIG. 12. In this form, the pivoted arms 12 are biased inwardly by individual cylinder assemblies 70 pivotally connected at one end to the ring apparatus 13 and their remaining ends to the individual arms 12. An equalizing hydraulic circuit is applied to the cylinders 70 to maintain an equal pressure against the pile contacted by the arms 12 during rotation of the arm apparatus 13.

Figure 13:
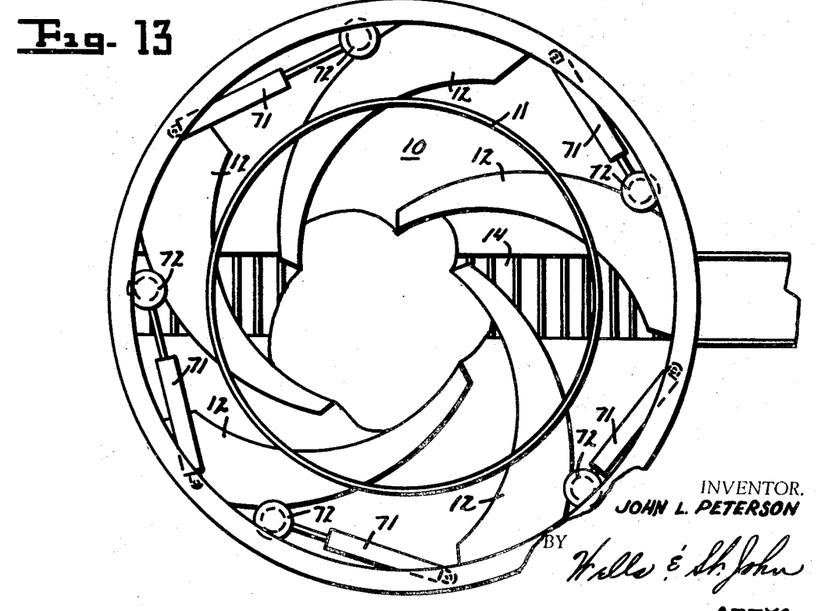
FIG. 13 is a view similar to FIG. 2 showing a second modification of the structure.

Another modification, again using hydraulic pressure as a biasing means, is shown in FIG. 13. In this arrangement, the arms 12 are biased by hydraulic cylinder assemblies 71, one end of each cylinder assembly 71 being pivoted about a vertical axis fixed on the ring assembly 13. The free end of each cylinder assembly 71 is provided with a spool shaped roller 72 which acts as a cam, being in rolling engagement with both the ring apparatus 13 and the back surfaces of the arms 12. This provides additional mechanical advantage in the hydraulic biasing apparatus. Again, an equalized hydraulic system is maintained to provide even distribution of force between the several cylinders 71.

Modifications can obviously be made in the details of the structure illustrated without deviating from the basic scope of this improvement.

I claim:
1. In an apparatus for particle transfer from a storage pile of the type comprising:
   a horizontal support for the pile including recessed conveyors extending outwardly from the pile below the upper surface of the support;
   ring means encircling the pile upwardly adjacent to the upper surface of the support and rotatably carried on said support fr movement about a vertical central axis within the pile;
   and drive means operatively connected to said ring means for rotating the ring means about said vertical axis;
   the improvement comprising an elongated arm inward of said ring, one end of said arm being pivotally connected to the ring and the remaining end thereof trailing inwardly in the direction of movement of said ring relative to said support;

said arm including an elongated upright member adapted to engage the periphery of a particle pile on the upper surface of said support, said elongated upright member having an inwardly facing concave surface configuration in a horizontal plane;

means mounted to said arm for urging the trailing end thereof toward the center of said support during rotational movement of said ring means relative to said support; and an upper protective member mounted to and extending transversely from said elongated upright member, the horizontal width of said member being progressively diminished toward the trailing end of said arm.

2. The improvement set out in claim 1 wherein the edge configuration of said protective member has an inwardly facing concave shape in a horizontal plane.

3. An improvement as set out in claim 1 wherein the inner and outer edges of said protective member converge toward one another and toward the elongated upright member at the trailing end of said arm.

4. The improvement as set out in claim 1 wherein the inwardly facing edge of said protective member is concavely curved in a horizontal plane, the radius of curvature of said inner edge being less than the maximum radius of the pile on said support.

5. The improvement as set out in claim 1 wherein the maximum inward lateral width of said arm is less than the radial separation between the pivotal connection of the arm to said ring and the outer periphery of the pile.

6. The improvement as set out in claim 1 wherein the effective maximum length of said arm is equal to the radius of its pivotal connection to said ring with respect to the center of the pile on said support.

7. In an apparatus for reclaiming bulk material of the type comprising:

a slab having an upper surface upon which bulk material is piles;

peripheral upright walls spaced upwardly from the slab and defining the outer pile boundaries;

a power driven peripheral member movably mounted outside said walls for movement about a path surrounding the pile;

a substantially rigid sweep assembly comprising a plurality of arms, each having one end pivotally connected to said member and the remaining end thereof trailing about said member as the arm is pulled about the slab, each arm being projected inwardly beneath said upright walls toward the pile for engaging the peripheral pile edges;

the improvement comprising a sweep structure including an elongated upright member having an inwardly facing arcuate concave configuration in a horizontal plane; and a horizontal upper plate spaced upwardly from the slab along the upper edge of the elongated upright member, said plate extending outwardly to both sides of said upright member with the side edges thereof converging toward the trailing end of said arm.

8. The apparatus as set out in claim 7, wherein the side edges of each of said plates are curved so as to be capable of forming an elongated recess through which the arm can be pulled outward of the pile following collapse of the pile structure on the arms.